June 6, 1961
W. B. HANDWERK ET AL
2,987,608
APPARATUS FOR EFFECTING AN INTERNALLY WELDED
INTERCONNECTION BETWEEN PIPE SECTIONS
Filed Aug. 18, 1958
5 Sheets-Sheet 1
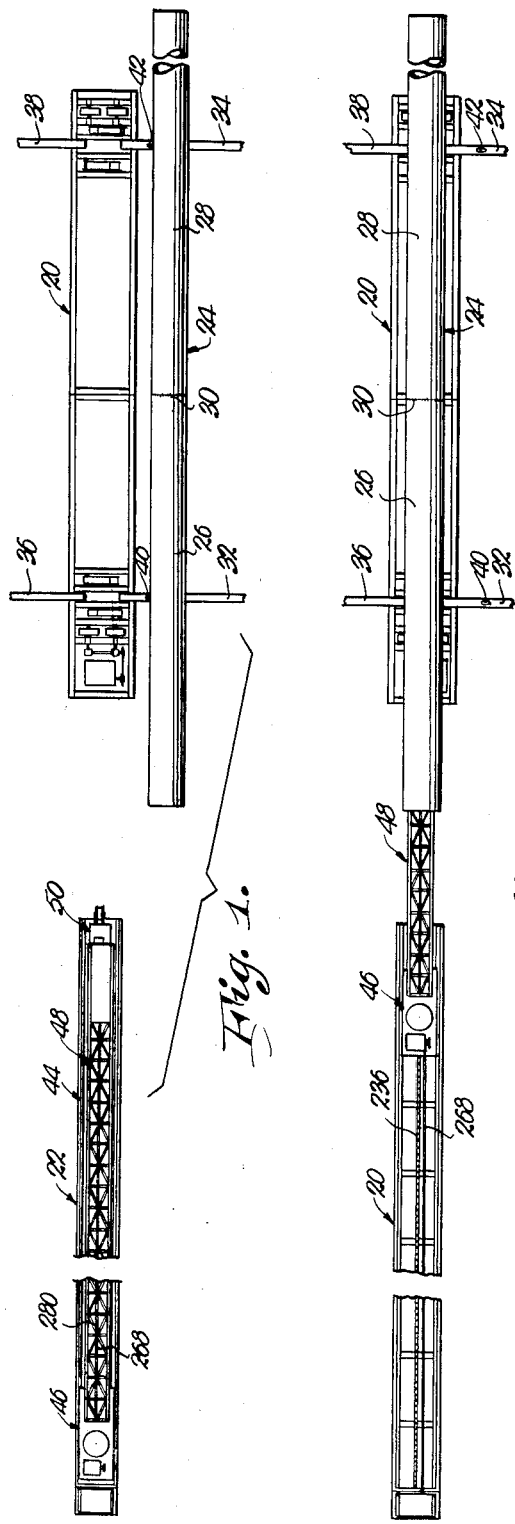
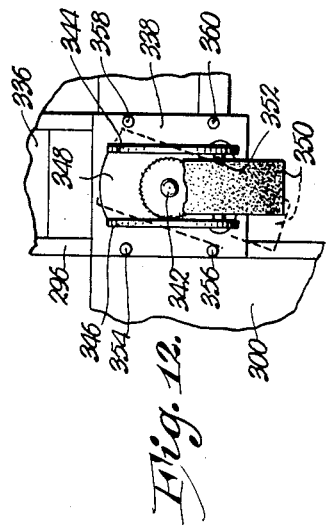
William B. Handwerk
Estill Sherrill
INVENTORS.
BY
ATTORNEY.

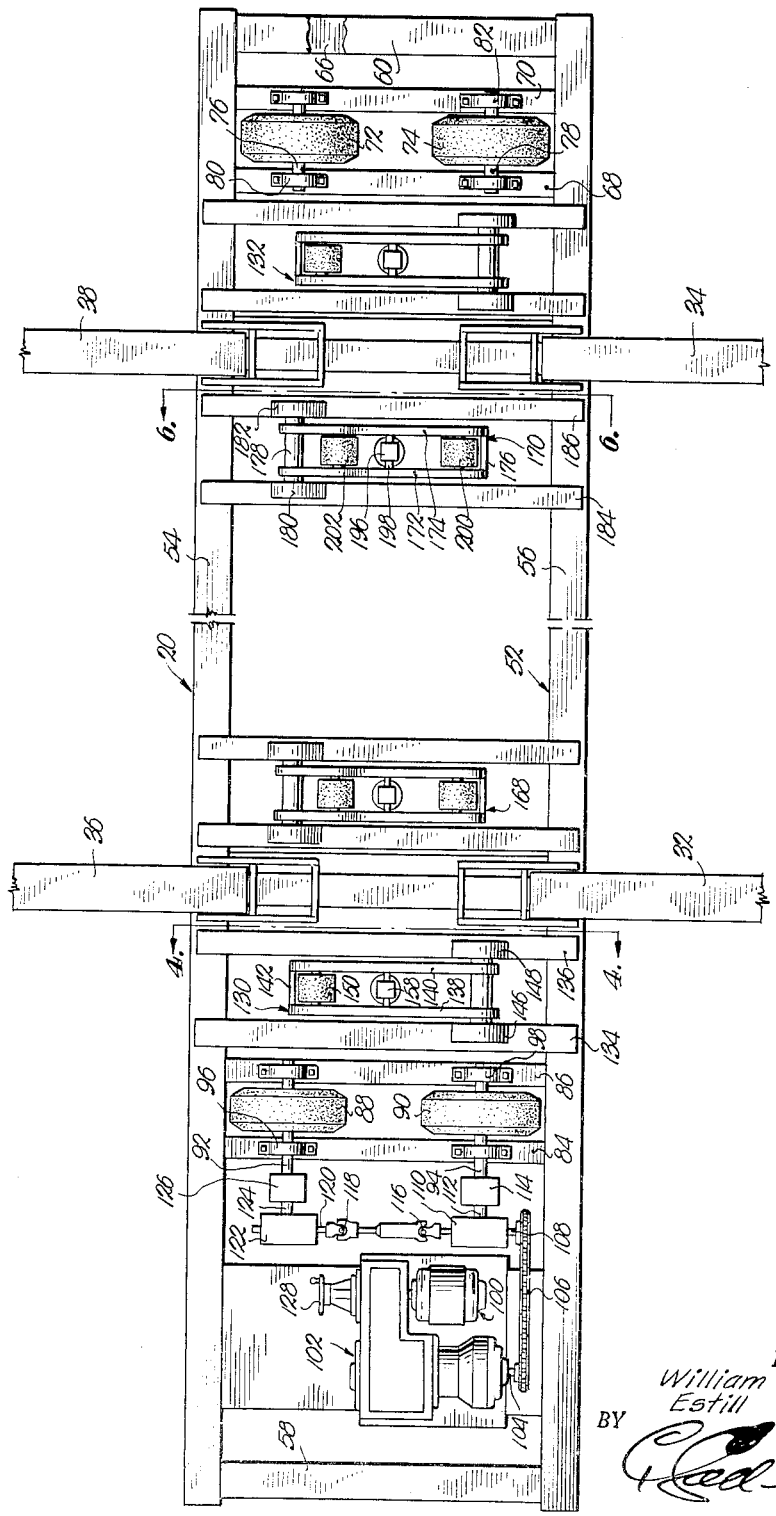

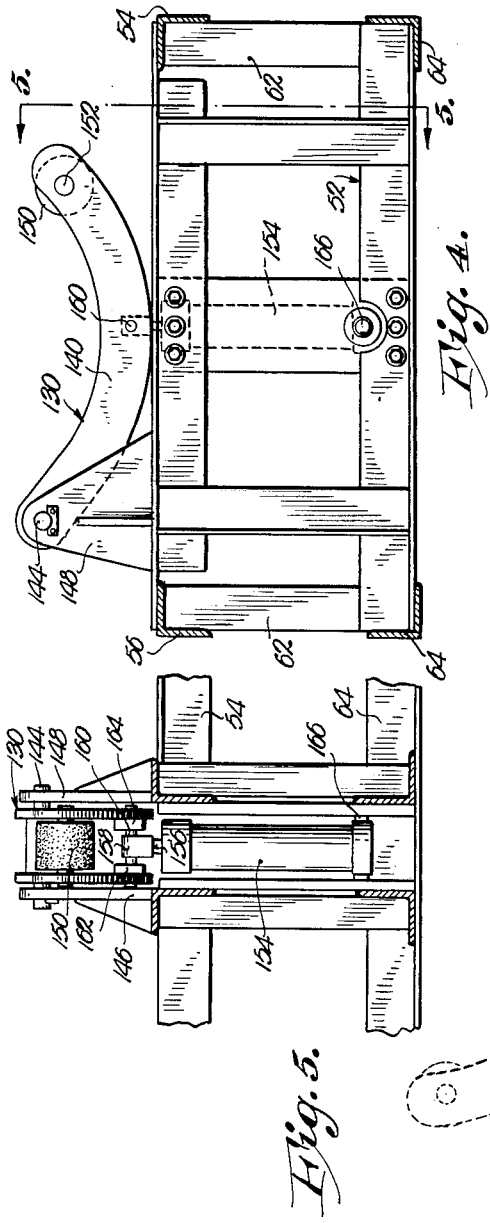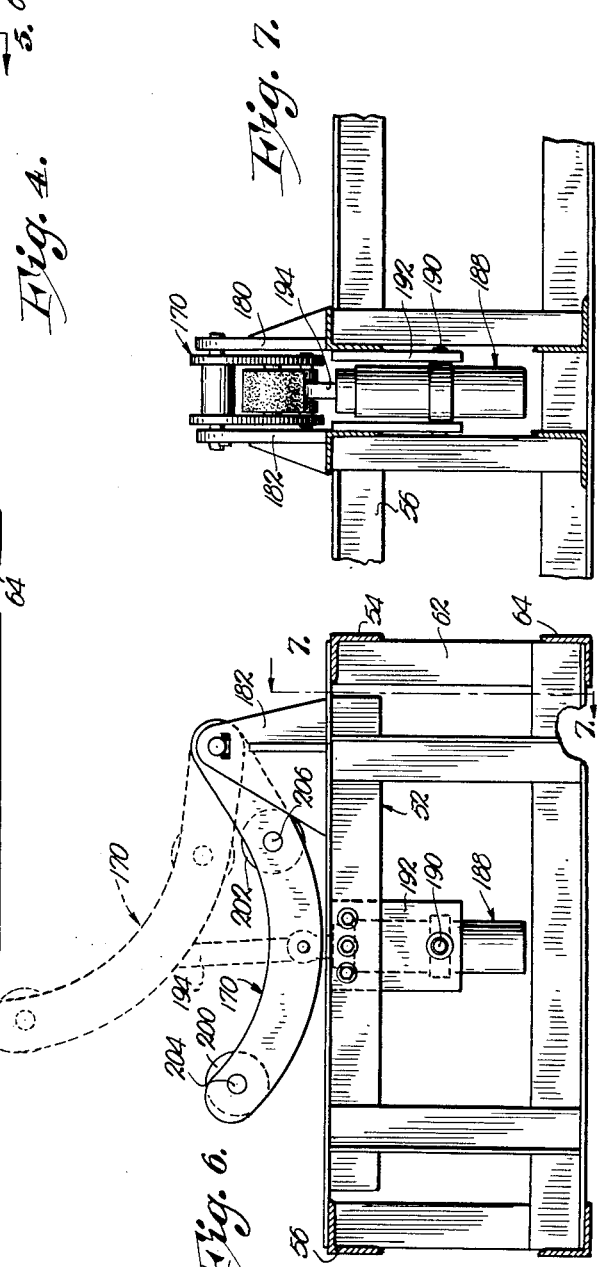

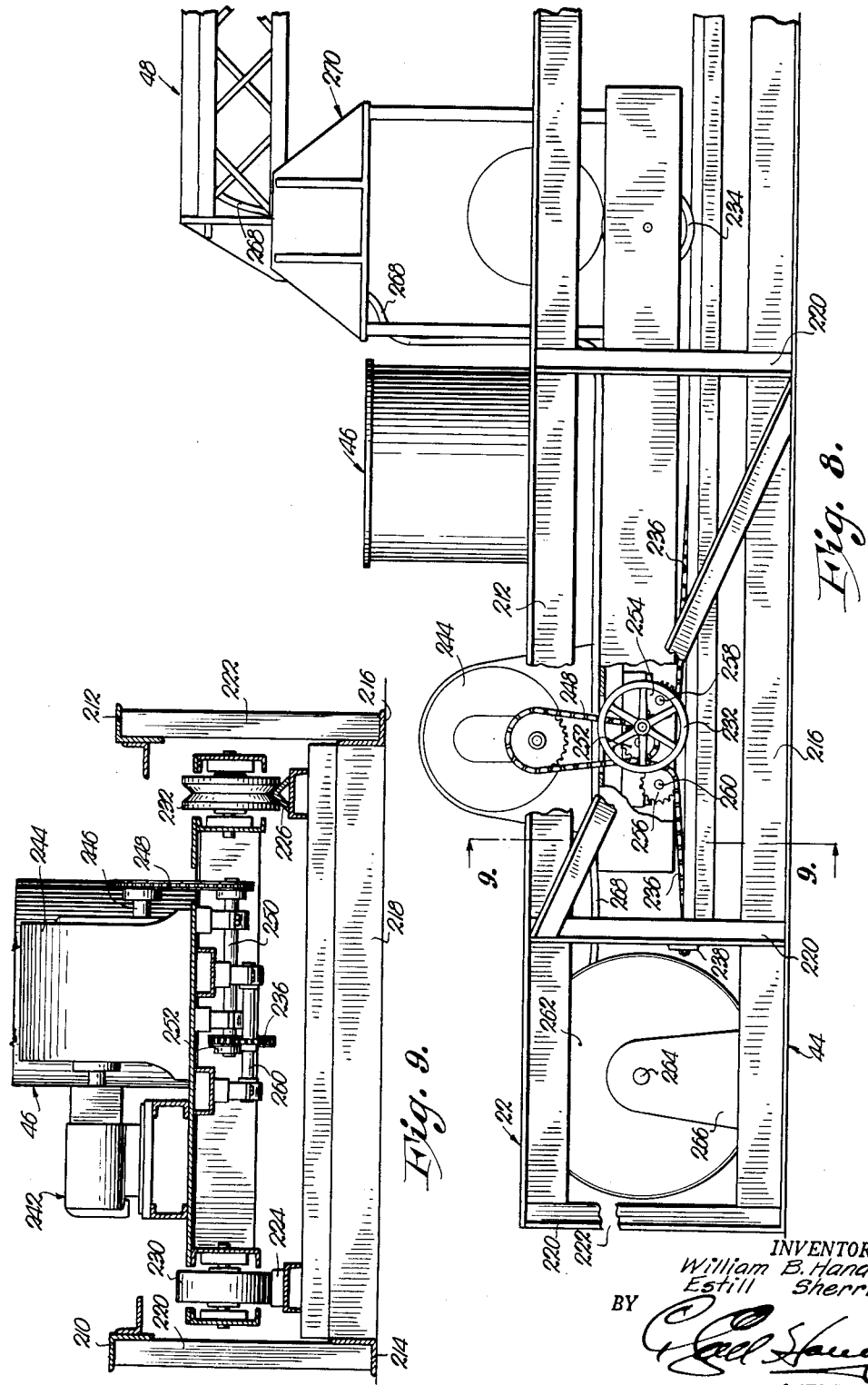

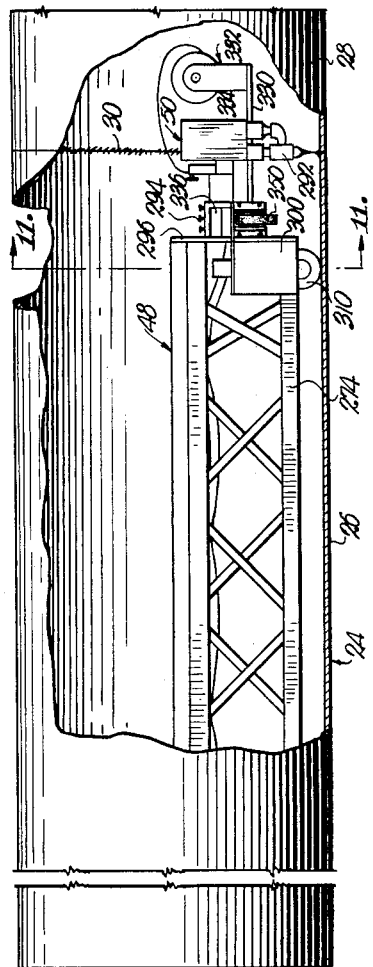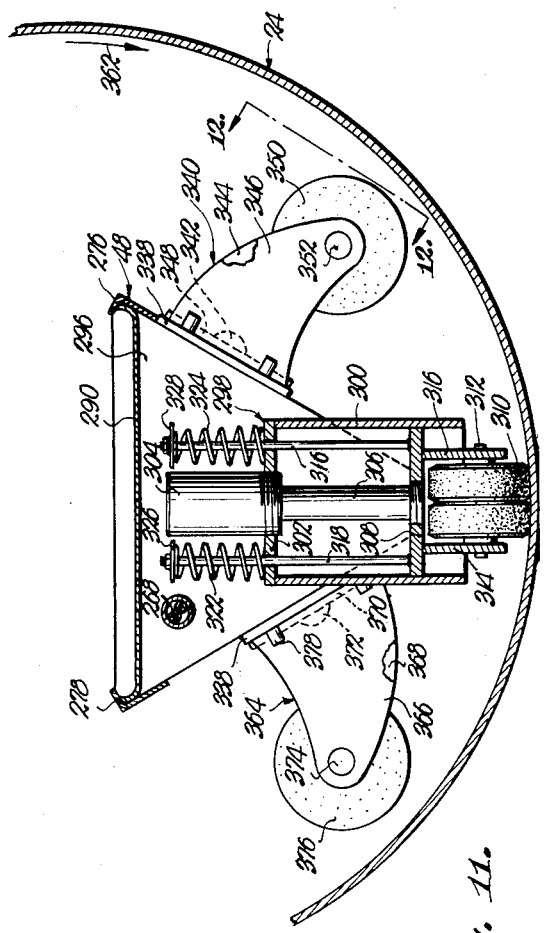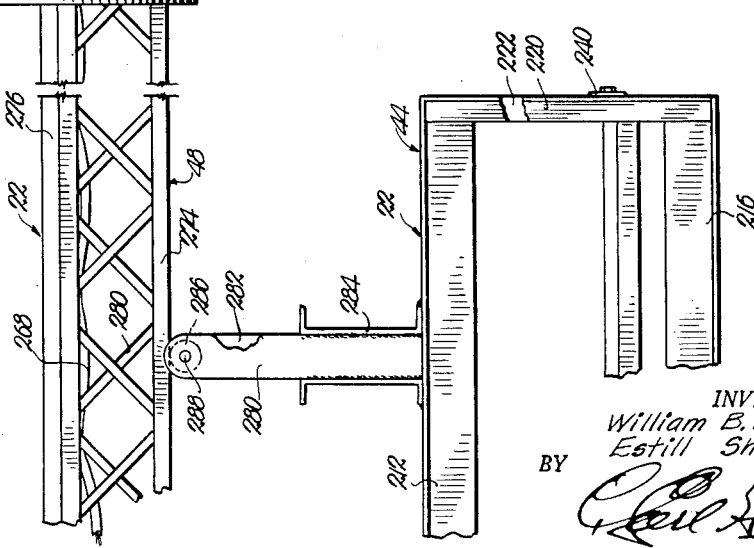

United States Patent Office 2,987,608
Patented June 6, 1961

2,987,608
APPARATUS FOR EFFECTING AN INTERNALLY WELDED INTERCONNECTION BETWEEN PIPE SECTIONS
William B. Handwerk and Estill Sherrill, Tulsa, Okla., assignors to M. J. Crose Manufacturing Co., Inc., Tulsa, Okla., a corporation of Oklahoma
Filed Aug. 18, 1958, Ser. No. 755,667
5 Claims. (Cl. 219—60)

This invention relates to improved apparatus by which longitudinally abutting, externally interconnected pipe sections of relatively large diameter may be internally welded at their zone of abutment.

The process of double jointing pipes of relatively large diameters has been heretofore known. In such process, two sections of large pipe, which may be, for instance, each forty feet long, are abutted at their adjacent ends and interconnected to form one double jointed pipe by first, externally welding the two sections together around their zone of abutment, and then internally welding the same around said zone of abutment from within the already interconnected pipe sections. With relatively heavy pipes of the order of thirty inches or the like in diameter, submerged arc welding is preferred. Accordingly, it has been found in practice of the process that it is difficult, if not impossible, for a welder to crawl into the interconnected pipe sections and handle the equipment required for accomplishing a submerged arc weld around the zone of abutment of the pipe sections. It has, therefore, been proposed that the welding equipment may be advanced into the pipe sections by means of a boom or the like and held in contact with the zone of engagement of the sections while the latter are rotated to effect a weld thereabout. However, in the last mentioned approach to the problem, there is no human operator within the pipe sections to control the operation of the welding equipment or to effect exact alignment of the latter with the zone of abutment of the pipe sections around which the weld is to be made. Accordingly, it has heretofore been necessary to rely upon such expedients as attempting to advance the welding equipment into the pipe sections a predetermined distance in order to effect alignment of the welding equipment with the zone of abutment of the pipe sections. However, such alignment procedure has proved rather unsatisfactory in operation because of the difficulties of accomplishing accurate alignment, and has also been possessed of the disadvantage that, when irregularities in the operation of the welding equipment occur, or when irregularities in the pipe occurs which would require adjustment of the welding equipment for proper welding of the particular pipes, there is no human operator present within the rotating pipe sections who can observe the nature of the difficulties or make appropriate adjustments to properly control the welding process.

Accordingly, it is one of the primary objects of this invention to provide improved apparatus for the submerged arc welding of an internal connection around the zone of abutment of already interconnected pipes of relatively large diameter, in which provision is made for the advancement and withdrawal of a human welding operator into the pipe sections in such manner that he will be safe, relatively comfortable, and situated so as to exert an effective control over the welding operation during rotation of the pipe sections.

It is another important object of this invention to provide such improved internal welding apparatus which includes means for supporting the end portion of a boom to be advanced into the pipe sections with a human operator and appropriate welding equipment carried thereby, with such support being derived directly from one of the pipe sections alternately in manner to support such boom portion during advancement or withdrawal of same from the pipe section and in manner for supporting the same during rotation of the pipe occurring during the welding operation.

Another important object of the invention is the provision in such improved internal welding apparatus of improved means for advancing and supporting an elongated, horizontal boom carrying a human operator and welding equipment for advancement or withdrawal into a pipe section of relatively large diameter.

Another important object of this invention is to provide such improved internal welding apparatus which includes power operable means for shifting pipe sections from incoming skidways onto a set of turning rollers, for driving the turning rollers to rotate the pipe in the manner required for satisfactory internal welding around their zone of abutment, and for lifting the welded pipe sections off of the turning rollers and delivering the same to outgoing skidways, all without damage to the turning rollers or the pipe sections.

Still other important objects of this invention will be made clear or become apparent from the accompanying drawings and the description of an illustrated, currently preferred embodiment of the invention therein shown.

In the accompanying drawings:

FIG. 1 is a fragmentary, top plan view of a portion of a welding yard layout illustrating the disposition of the internal welding apparatus preparatory to advancement of a pair of abutting, externally interconnected pipe sections into position for the internal welding thereof;

FIG. 2 is a fragmentary, top plan view similar to FIG. 1, but showing the pipe sections in position for internal welding thereof and the boom and associated parts of the welding apparatus advanced to a position for accomplishing such welding operation;

FIG. 3 is a top plan view of the pipe supporting and turning rack forming a part of the apparatus contemplated by the invention, in which portions of the incoming and outgoing skidways are also illustrated;

FIG. 4 is a cross sectional view taken on line 4—4 of FIG. 3;

FIG. 5 is a cross sectional view taken on line 5—5 of FIG. 4;

FIG. 6 is a cross sectional view taken on line 6—6 of FIG. 3;

FIG. 7 is a cross sectional view taken on line 7—7 of FIG. 6;

FIG. 8 is a fragmentary, side elevational view of a front portion of the boom, the boom supporting and shifting carriage and the boom carriage track assembly;

FIG. 9 is a cross sectional view taken on line 9—9 of FIG. 8;

FIG. 10 is a fragmentary, side elevational view of a front portion of the boom and the boom carriage track assembly, showing the boom extended into one of the pipe sections and essentially aligned for lowering of the boom and welding equipment into operative welding relationship with the pipe sections;

FIG. 11 is a fragmentary, cross sectional view taken on line 11—11 of FIG. 10; and FIG. 12 is a fragmentary, elevational view of one of the boom supporting caster assemblies taken substantially along line 12—12 of FIG. 11.

Referring now to the drawings, the internal welding apparatus contemplated by the invention, in its preferred form, includes a pipe supporting and rotating rack assembly generally designated 20, with associated parts hereinafter to be described, and a shiftable boom assembly generally designated 22 also having associated parts hereinafter to be more fully described.

FIG. 1 illustrates a stand-by condition of the apparatus in which a pipe generally designated 24 having a pair of elongated sections 26 and 28 abutting at their proximate ends and interconnected by external welding as at 30 is supported upon a pair of spaced, incoming skidways 32 and 34 leading to the rack assembly 20 from one direction transversely of the latter. It will be noted that there are also provided outgoing skidways 36 and 38 extending from the rack assembly 20 in the opposite direction. In such stand-by condition of the apparatus, the pipe 30 will be retained upon the incoming skidways 32 and 34 by trippable stops 40 and 42 in the skidways 32 and 34 respectively at a position adjacent to the rack assembly 20 and in readiness for delivery to the latter when the stops 40 and 42 are tripped. The boom assembly 22 broadly includes a track frame 44, a carriage 46, shiftably mounted on the track frame 44 for longitudinal movement along the latter, and an elongated boom 48 secured at one end thereof to the carriage 46 and extending from the latter a considerable distance sufficient to permit welding equipment 50 carried at the opposite end of the boom 48 to be aligned with zone 30 of the pipe 24 when the carriage 46 and boom 48 are moved in a direction properly positioning the boom 48 within the pipe 24. As will be apparent from the drawing, the assemblies 20 and 22 are arranged in spaced, longitudinal alignment and, during the mentioned stand-by condition of the apparatus, the carriage 46 and boom 48 are shifted toward a withdrawn position permitting advancement of the pipe 24 onto the rack 20 without interfering with the boom 48 or the welding equipment 50.

In FIG. 2 the pipe 24 is shown in the welding position upon the rack 20 and the carriage 46 and boom 48 of the assembly 20 have been shifted into an operative position, which it will be understood, properly aligns portions of the welding equipment 50 with the zone of abutting interengagement 30 between the pipe sections 26 and 28. It will be further understood and hereinafter more fully explained that the pipe 24 is rotated upon the rack assembly 20 by means provided on the latter to complete the desired internal weld around the zone of abutment 30, and then the carriage 46 and the boom 48 carried thereby are shifted in a direction to withdraw the boom 48 from the pipe 24, whereupon the latter may be discharged onto the outgoing skidways 36 and 38.

Referring now more particularly to FIGS. 3–7 inclusive, the rack assembly 20 will be seen to include a rigid metallic frame generally designated 52 comprised of metallic members interconnected in any suitable fashion as by welding, which members may include a pair of spaced, parallel, elongated side members 54 and 56 interconnected adjacent their ends by a pair of spaced, parallel end members 58 and 60, all supported in elevation by a plurality of upright post members 62 upon a base comprised of lower side members 64 and lower cross members 66. Obviously, further bracing for the frame 52 may be provided, the detail of which need not be here elaborated.

Adjacent one end of the frame 52 a pair of longitudinally spaced, transverse cross pieces 68 and 70, secured to the frame 52, carry a pair of transversely spaced, freely rotatable, turning, idler rollers 72 and 74 whose axis shafts 76 and 78 respectively extend in spaced, horizontal parallelism longitudinally of the assembly 20 and are rotatably carried by bearing means as at 80 and 82 upon the cross pieces 68 and 70. It may be noted that the spacing between the shafts 76 and 78 and the diameters of the rollers 72 and 74 are so chosen that a pipe 24 resting thereon will be elevated above the remainder of the assembly 20 for rotation relative to the latter. Similarly, adjacent the opposite end of the assembly 20, the frame 52 carries a pair of parallel, transversely extending cross pieces 84 and 86 for rotatably mounting a pair of driven turning rollers 88 and 90 secured to parallel shafts 92 and 94 respectively, which are rotatably supported upon the cross pieces 84 and 86 as by bearing means 96 and 98. Adjacent the location of driven turning rollers 88 and 90, there is mounted upon the assembly 20 in any suitable fashion, an electric drive motor generally designated 100 operably coupled with a variable-speed reducing transmission unit 102 having a power output shaft 104, sprocket and chain coupled as at 106 to a stub shaft 108 extending transversely of the assembly 20 through a right angle drive box 110 and drivingly coupled with a right angle shaft 112 longitudinal to the assembly 20 and coupled with the roller shaft 94 as by a coupler 114. The extension of shaft 108 is preferably coupled through a pair of universal couplings 116 and 118 with the transverse shaft 120 of a second right angle drive box 122 having a longitudinal output shaft 124 coupled with the roller shaft 92 as by a coupler 126. It may be noted that the couplers 114 and 126 may be somewhat flexible in nature to permit a small degree of misalignment between the corresponding pairs of shafts 112 and 94 or 124 and 92, and that the provision of the universal couplings 116 and 118 is a construction greatly to be preferred in order to eliminate difficulties in driving the turning rollers 88 and 90 at precisely the same speeds and in the same direction when the rollers 88 and 90 and the frame 52 are bearing the weight of a heavy pipe 24 and when the frame 52 or cross pieces 84 and 86 may be under the influence of expansion due to ambient heat or contraction due to ambient cold. All of the turning rollers 72, 74, 88 and 90 are preferably provided with peripheral surfaces of rubber or the like, both in order to protect the pipe 24 and with a view to providing good tractional coupling between the rollers 88 and 90 and he outer surface of pipe 24 for rotation of the latter. A speed control adjustment upon the variable speed drive unit 102 is indicated as at 128, and it will be understood that electrical means for switching the power on and off of the motor 100 may be provided for operation by a human operator to control the rotation of the pipe 24.

It will be understood that during rotation of a pipe 24 upon the turning rollers 72, 74, 88 and 90, it is important that the pipe 24 not be simultaneously shifted in a longitudinal direction. Accordingly, pains should be taken for proper longitudinal alignment of the shafts 76, 78, 92 and 94 and also to prevent damage to or uneven wear of the rollers 72, 74, 88 and 90. It is found that both of these objectives are best attained by the illustrated construction in which only one pair 88 and 90 of the turning rollers are driven and in which same are driven at precisely the same speed and in the same direction.

In order to prevent damage to the turning rollers 88, 90, 72 and 74 it has been found advisable to provide means for rather gently lowering a pipe 24 from the skidways 32 and 34 onto the turning rollers 88, 90, 72 and 74. Such means includes a pair of lowering-in arms 130 and 132 spaced longitudinally of the assembly 20 and each supported on the frame 52 by means of a pair of transverse cross pieces 134 and 136. Since the lowering-in arms 130 and 132 are identical except for their locations, description of only the former, which is illustrated in FIGS. 3, 4 and 5, will suffice. The lowering-in arm 130 is generally U-shaped in character having a pair of spaced legs 138 and 140 each of which is elongated, concavely curved along their upper edges and interconnected at one end thereof by a bight 142. At the ends of arms 138 and 140 remote from bight 142, same are secured to a pivot shaft 144 pivotally received in bearings 146 and 148 provided on the cross pieces 134 and 136 adjacent the side member 56 of frame 52. Adjacent the ends of legs 138 and 140 proximate bight 142, a preferably rubber surfaced roller 150 is mounted for free rotation upon a pin 152. Mounted on the frame 52 below the arm 130 is a hydraulic power cylinder unit 154 having a vertical piston rod 156 pivotally interconnected with the legs 138 and 140 of arm 130 by means of a pivot block 158 upon a shaft 160 oppositely received by bearings 162 and 164 upon the arms 138 and 140. It may be noted that the cylinder portion of unit 154 is also pivotally secured to the frame 52 by a pin 166. The hydraulic power unit 154 is thus adapted upon actuation to swing the arm 130 upwardly or downwardly about the axis of pivot shaft 144. As will be most apparent from FIGS. 4 and 5, the bearings 146 and 148 extend upwardly somewhat from the level of side members 54 and 56 of frame 52, so that, taking into account the upwardly concave curvature of the legs 138 and 140, when the arm 130 is elevated to an uppermost position by the power unit 154, the legs 138 and 140 will be disposed to receive a pipe 24 rolling off of the skidways 32 and 34 at a level such that the pipe 24 does not engage any of the turning rollers 88, 90, 72 and 74. It will be further evident that when the power unit 154 is operated to lower the arm 130 (the companion arm 132, of course, being simultaneously shifted), the pipe 24 theretofore carried by the arms 130 and 132 will be gently lowered onto the turning rollers 88, 90, 72 and 74 and at least substantially centered relative to the latter by virtue of the mentioned curvature of the legs 138 and 140. As the operation of the power units 154 is continued to further lower the arms 130 and 132, the latter swing to a level below that at which the pipe 24 is supported upon the turning rollers 88, 90, 72 and 74. The small rollers 150 function both as stops to prevent the pipe 24 from rolling off of the ends of the arms 130 and 132 and also to expedite any necessary slight rotational movement of the pipe 24 relative to the lowering-in arms 130 and 132 as the latter are lowered.

Similarly, it has been found desirable to provide special means for removing the pipe 24 from the turning rollers 88, 90, 72 and 74, in order to avoid damage to the latter or to the pipe 24. Such pipe removing means may, as illustrated, include a pair of kick-out arms generally designated 168 and 170, which are spaced longitudinally of the assembly 20 and are otherwise identical so that description of only the kick-out arm 170 will suffice. Such kick-out arm 170 is shown in FIGS. 3, 6 and 7 and will immediately be seen to be somewhat similar in character to the above-described lowering-in arm 130. The kick-out arm 170 is generally U-shaped in character having a pair of side legs 172 and 174 interconnected at one end thereof by a bight 176. Adjacent the opposite end of the legs 172 and 174, whose upper surfaces are concavely curved, is a pivot pin 178 received within upstanding bearing brackets 180 and 182 respectively supported upon cross pieces 184 and 186 secured to the side members 54 and 56 of frame 52 transversely of the latter. Below the kick-out arm 170 there is provided a hydraulic power cylinder unit generally designated 188, pivotally mounted by a pin 190 upon brackets 192 depending from a portion of frame 52 and having a reciprocable piston 194 pivotally interconnected at its uppermost extremity to the legs 172 and 174 of arm 170 by means of a pivot block 196 and pivot pin 198. It will be noted that the bearing brackets 180 and 182 and the pivot pin 178 are located adjacent the side member 54 of frame 52 so that the arm 170 (and the other kick-out arm 168), may be swung about the pivotal axis of pin 178 between the solid line and dotted line positions indicated in FIG. 6, when the corresponding power units 188 are operated. It will be understood that the arms 170 and 168 normally are at the solid line position of FIG. 6 in which they are disposed below a pipe 24 upon the turning rollers 88, 90, 72 and 74 so as to clear the pipe 24. However, upon corresponding operation of the hydraulic power units 188, the kick-out arms 170 and 168 are raised to the dotted line positions during which the pipe 24 is lifted off of the turning rollers 88, 90, 72 and 74 and caused to roll by gravity off of the end of the kick-out arms 168 and 170 onto the outgoing skidways 36 and 38. As illustrated, the kick-out arm 170 (and the arm 168), is preferably provided with a rotatably mounted outer roller 200 and a rotatably mounted inner roller 202, each supported upon a corresponding shaft 204 and 206 respectively. Such rollers 200 and 202 serve to retain the pipe 24 upon the kick-out arms 170 and 168 until the latter are raised to a position for smoothly discharging the pipe 24 onto the skidways 36 and 38, whereupon the rollers 202 then further aid in permitting the discharge of the pipe 24 onto such skidways 36 and 38.

It will thus be apparent that the rack assembly 20 portion of the overall apparatus includes certain advantageous improvements.

Attention may next be directed more particularly to FIGS. 8–11 inclusive, which relate to the boom assembly portion 22 of the internal welding apparatus. As was the case with assembly 20, the assembly 22 includes a rigid frame 44 of welded or otherwise suitably interconnected metallic members of which it should be sufficient to identify a pair of longitudinally extending upper side members 210 and 212, a pair of lower side members 214 and 216, a number of longitudinally spaced, transverse members 218 interconnecting the lower members 214 and 216 and a number of upright post members 220 and 222 spaced longitudinally along the lower side members 214 and 216 respectively and extending thereabove for supporting the upper side members 210 and 212 respectively. Extending longitudinally of the assembly 22 in parallelism with each other and supported on the cross members 218, are a pair of spaced tracks 224 and 226, the former preferably having a flat track surface while the latter has a track surface of inverted V-shaped section. Mounted for reciprocation along the tracks 224 and 226 is a boom carrying carriage assembly 46 having mounted thereon for free rotation a rear track wheel 230 having a flat periphery engaged upon the track 224, a rear track wheel 232 having a peripherally grooved periphery engaged upon the track 226, a front, grooved track wheel 234 engaged upon the track 226 and an opposite, front track wheel (not shown) having a flat peripheral surface engaged upon the track 224. Since all of the just mentioned track wheels 230 et seq. are freely rotatable upon the carriage 46, it will be clear that the latter is shiftably supported by such wheels for relatively free movement along the tracks 224 and 226, the cooperation between the grooved peripheries of the wheels 232 and 234 and the V-shaped configuration of track 226 functioning to render the carriage 46 shiftable along a substantially linear, horizontal path, despite such factors as slight variations in the spacing of the tracks 224 and 226 caused by ambient temperature effects or the like upon the frame 44. It will be observed, however, that it is particularly important that the track 226 be straight, in order to maintain the path of travel of the carriage 46 linear. With a further view to maintaining the linearity of travel of the carriage 46, the significance of which will hereinafter become apparent, special means are provided for driving the carriage 46 along the tracks 224 and 226. Such driving means include an elongated chain 236 secured at its rear end to a cross piece 238 extending between a pair of post members 220 and 222 and extending forwardly from such member 238 to a point of opposite securement at the forwardmost end of frame 44 by connection to a cross piece 240 extending between the frontmost posts 220 and 222. A suitable prime mover 242, which may be an electric motor, is mounted on the carriage 46 and coupled through a suitable step-down mechanism 244 with a shaft 246 in turn coupled by sprocket and chain means 248 with a parallel shaft 250 rotatably carried by the carriage 46 for rotation upon a lower horizontal axis. Mounted upon the shaft 250 substantially midway between tracks 224 and 226 is a sprocket 252, and there are provided forwardly and rearwardly respectively of the sprocket 252, a pair of idler sprockets 254 and 256 carried by the carriage 46 for free rotation upon shafts 258 and 260 respectively. The chain 236, which need not be maintained unduly taut, extends from its rear connection with cross piece 238 under and around a portion of the idler sprocket 256 thence into engagement with one side of the sprocket 252 and over the latter, thence under and around a portion of the idler sprocket 254, and thence forwardly to its point of interconnection with the cross piece 240. As the prime mover 242, which it will be understood should be reversible, drives the shaft 250 to rotate the sprocket 252, the engagement of the latter with the chain 236 will "walk" the carriage 46 along the chain 236 upon the tracks 224 and 226. It is deemed important both that the sprockets 252, 254 and 256 be disposed substantially midway between the tracks 224 and 226 and that the sprockets 254 and 256 have their axes of rotation sufficiently low that there is no tendency for the chain 236 to exert any vertical tipping effect upon the carriage 46 as the latter is advanced therealong.

The carriage 46 is preferably weighted or made of heavy construction so as to enjoy a relatively high degree of stability, particularly against tipping about the axes of rotation of the front wheels as at 234, by virtue of the leverage exerted by the relatively long boom extending forwardly from the carriage 46 carried by the latter and as will hereinafter be described. It may also be noted that the carriage 46, may, if desired, carry generating equipment or other electrical apparatus normally forming a part of a submerged arc welding system. For purposes of illustration, however, the preferred embodiment shows a cable reel 262 rotatably carried upon a transverse shaft 264 supported by brackets 266 on the frame 208 adjacent the rear thereof for taking up and paying out one or more cables 268, which it will be understood may be appropriately energized from stationary means adjacent the assembly 22.

On the forward part of carriage 46 there is provided upstanding mounting means generally designated 270 to which is secured the rearmost extremity of the forwardly extending, elongated boom 48. The boom 48 itself must be of both a high degree of rigidity and nonexcessive weight. The preferred construction, therefore, has been found in the provision of a longitudinal, lowermost angle element 274 and a pair of spaced, uppermost longitudinal angle elements 276 and 278, which are disposed above and to the opposite sides of the bottom element 274. Angled bracing means as at 280 are provided for interconnecting the various elements 274, 276 and 278 to render the boom 48 rigid. It will be noted that the cable 268 may extend along the boom 48 within the latter to provide energizing current to the welding equipment 50 and control connections to certain operator controls hereinafter to be mentioned.

Toward the forward end of frame 44, there are provided a pair of upstanding brackets 280 and 282 spaced transversely of the frame 44 and secured to the upper side elements 210 and 212 of the latter as by cross elements 284. Extending across between the brackets 280 and 282 for free rotation is a roller 286 carried by a shaft 288. The roller 286 serves to support the boom 48 adjacent the front end of frame 44 as the carriage 46 is shifted forwardly and rearwardly of the assembly 22, it being observed that such support is attained through the resting engagement of the lower longitudinal element 274 of frame 48 directly upon the rotatable support roller 286.

Adjacent the forward end of boom 48 there is provided a pallet panel 290 extending between and oppositely secured to the upper elements 274 and 278 of frame 48. Such pallet panel 290 extends rearwardly for a distance sufficient to receive and support thereon a human operator. It will be noted that the pallet 290 extends substantially to the forwardmost end of the boom 48 so that an operator, when lying prone thereupon, will have not only a full view of the operational area of the welding head 292 of the equipment 50 but also manual access to certain control knobs and the like 294 by which he may control the operation of the welding equipment 50, the motor 242 for shifting the carriage 46 and boom 48 and, if desired, even the motor 102 on the rack assembly 20 for rotating the pipe 24 (it being understood that suitable electrical connections may be provided by the cabling 268 and other conventional electrical couplings not necessary to be shown in detail).

In view of the length of the boom 48 and the length of the pipe section 26 through which the forwardmost end of the boom 48 must be advanced and withdrawn and into which the same must extend during the welding operation, and in further view of the substantial weight of not only such forward portion of the boom 48 but also that of the human operator upon pallet 290 and the welding equipment 50, it is essential that suitable means be provided for supporting the forward end of the boom 48 both during the advancement and withdrawal thereof and during the rotation of the pipe 24 required to complete the welding operation. Particularly referring to FIGS. 10 and 11, therefore, it will be seen that a front panel 296 is provided at the forward ends of boom elements 276 and 278 and that there is secured to the latter by welding or the like, a retractable wheel assembly generally designated 298, the lower boom element 274 being secured to such assembly 298 by welding or the like. Assembly 298 includes a hollow, open bottom housing 300 having threadably or otherwise suitably mounted in the top wall 302 thereof, a hydraulic cylinder assembly 304 provided with a vertically reciprocable piston 306 to the lower extremity of which is secured a reciprocable plate 308 within the housing 300. Pipe engaging wheel means 310 are mounted for free rotation by a shaft 312 extending between brackets 314 and 316 depending from the plate 308. In order to bias the plate 308 and wheels 310 to a normally uppermost position, there are provided a pair of rods 318 and 320 secured at their lowermost ends to the plate 308, extending upwardly therefrom through the upper wall 302 of assembly 298, together with spring means 322 and 324 bearing at their lower extremities upon the wall 302 and at their upper extremities upon discs 326 and 329 respectively, secured to the uppermost ends of rods 318 and 320. It will, therefore, be understood that when the boom 48 is to be shifted longitudinally of the pipe 24, the human operator upon the pallet 290 operates the appropriate one of his controls 294 to cause downward shifting of the piston 306 and the wheels 310 to a position as illustrated in FIGS. 10 and 11 where the wheels 310 are riding upon the pipe 24 and the front end of the boom 48 supported thereby. When the boom 48 and welding head 292 have been properly positioned relative to the line of engagement 30 between the pipe sections 26 and 28, the operator upon pallet 290 may so operate his controls 294 as to release the downward force upon the piston 306, whereupon the springs 322 and 324 will draw the piston 306, plate 308 and wheels 310 to an uppermost position in which they will no longer be engaging the pipe 24, as will hereinafter be made clear. It may also be observed in connection with the assembly 324, that rods 318 and 320 serve to prevent rotation of the plate 308 and the wheels 310 upon the axis of piston 306.

It will be noted that there is provided upon the front wall 296 of boom 48, certain forwardly extending support structure including a horizontal element 330 for supporting a welding wire reel and bracket generally designated 332, the welding unit 334 having the welding head 292 associated therewith and an operator control box 336. Referring now particularly to FIGS. 10, 11 and 12, it will be seen that the wall 296 and element 330 further carry in any suitable manner of securement thereto, a pair of opposed, inclined plates only one of which is illustrated in FIG. 12 and identified by the numeral 338. Rotatably mounted upon one of the plates 338 is a caster assembly generally designated 340 which is rotatable about the axis of a pivot pin 342. The caster assembly 340 includes a U-shaped bracket having a pair of parallel, spaced, curved side pieces 344 and 346 interconnected by a bight plate 348 which is pivoted by the pin 342 to the stationary plate 338. A caster wheel 350 is rotatably mounted between the legs 344 and 346 by means of a pivot shaft 352. It will be noted that the legs 344 and 346 of caster assembly 340 are so curved that the axis of the shaft 352 is substantially below the axis of caster rotation defined by the pin 342. It may also be noted that the plate 338 is preferably provided with a number of outstanding stop pins 354, 356, 358 and 360 for confining the extent of swinging caster movement of the assembly 340 upon the pin 342. Thus, the caster assembly 340 is free to swing upon the axis of pin 342 through a relatively small angle in order to allow for irregularities in the pipe 24 during rotation of the latter in the direction indicated by the arrow 362 in FIG. 11, but is prevented from any wide degree of swing which might tend to shift the boom 48 and the welding head 292 longitudinally with respect to the pipe 24 during rotation of the latter, both by virtue of the limiting effect of pins 354, 356, 358 and 360 and the mentioned curvature of the legs 344 and 346 with the resultant offset of the axis of shaft 352 below the extended axis of pin 342.

In view of the assumed rotational direction 362 for the pipe 24, a caster assembly 364 provided upon the opposite plate 338 is oriented oppositely to the assembly 340 and has its axis of caster pivot somewhat below that of the assembly 340. The assembly 364 is otherwise similar to the assembly 340 and includes a pair of spaced, parallel, upwardly curved legs 366 and 368 interconnected by a bight plate 370 pivotally mounted upon the corresponding plate 338 by a pivot pin 372. A shaft adjacent the outer ends of the legs 366 and 368 is designated by the numeral 374 and carries a freely rotatable caster wheel 376. Limiting stop pins, one of which is designated by the numeral 378 in FIG. 11, are provided upon the plate 338 for the assembly 364 for limiting the swinging caster movement of the latter in the same manner as previously described for the caster assembly 340. With respect to assembly 364, however, it will be observed that the axis of the shaft 374 upon which the wheel 376 rotates is disposed above the extended axis of the caster pivot pin 372. It will be further observed, however, that the axes of caster wheel shafts 352 and 374 are substantially on a horizontal level with each other so as to be balanced with respect to the boom 48. As will be apparent to those skilled in the art, the upturning of the legs 366 and 368 of the caster assembly 364, as well as the lower location of the corresponding plate 338, as compared with the corresponding parts of the assembly 340, is due to the assumed rotation of the pipe 24. If the direction of pipe 24 were to be reversed, the assemblies 340 and 364 would be also interchanged with respect to the sides of boom 48 upon which they are located.

It will be noted particularly in FIG. 10, that, when the wheels 310 for supporting the front end of the boom 48 during longitudinal movement thereof are in their lowered position, not only the caster wheels 350 and 376 but also the welding head 292 are withdrawn into spaced relationship to the interior wall of the pipe 24. When the operator upon pallet 290 raises the wheels 310, however, the boom 48 will be lowered so that the front end thereof will be supported upon the caster wheels 350 and 376 and simultaneously the welding head 292 will be lowered into operative juxtaposition with the proximate interior surface of the pipe 24. Although the submerged arc welding equipment 50 may be of various types, it is to be understood that means should be provided for making small adjustments in the positioning of the welding head 292, a suitable type of equipment 50 being that offered by Lincoln Electric Company as its Model LAF-3 submerged arc welding unit.

It will now be apparent that the improved apparatus provided by this invention is ideally adapted to accomplish all of the above-mentioned and other advantageous objects. It will be equally manifest, however, that certain modifications or changes in some details of construction could be made without departing from the true spirit and intention of the invention. Accordingly, it is to be understood that the invention should be deemed limited only by the scope of the claims that follow.

Having thus described the invention what is claimed as new and desired to be secured by Letters Patent is:

1. An apparatus for effecting an internally welded interconnection between longitudinally abutting, externally interconnected pipe sections of relatively large diameter, rack means for supporting said pipe sections with the longitudinal axes of the latter substantially horizontal; power means on said rack means operably engageable with said pipe sections for rotating the latter about their longitudinal axes; elongated boom means adjacent said rack means in substantial alignment with one open end of the pipe sections when the latter are disposed on said rack means; track means proximal to said rack means; carriage means movable on said track means; drive means on said carriage means for shifting the latter along said track means, said boom means being connected to said carriage means for movement therewith, said drive means including a driven sprocket on said carriage means, a prime mover on said carriage means operably coupled with said driven sprocket for driving the latter, a pair of idler sprockets on said carriage means, aligned with said driven sprocket longitudinally of said track means and oppositely offset from said driven sprocket, and elongated chain means having its ends oppositely secured beyond the extremities of the path of travel of said carriage means on said track means and having an intermediate portion thereof in operative engagement with each of said driven sprocket and said idler sprockets; pallet means on the end of said boom means normally adjacent the interconnected extremities of said pipe sections, and adapted to support human operator thereon in a prone position; welding means on said boom means adjacent the pallet means and operable under the control of said operator while the latter is in said prone position, to internally weld said pipe sections around their zone of abutment as said pipe sections are rotated; support means pivotally mounted on the lower portion of said boom means proximal to said pallet means and the welding means, said support means being pivotal about an axis substantially perpendicular to the axes of said pipe sections and provided with rotatable means thereon disposed to engage the inner surface of the proximal pipe section during rotation of the pipe sections and in supporting relationship to said boom means; and means on said one end of the boom means and operably coupled to said prime mover on the carriage means for permitting the operator to actuate said prime mover from a position on said pallet means and during rotation of said pipe sections, said support means pivoting, during shifting of the boom means longitudinally of said pipe sections, into disposition permitting the rotatable means thereon to roll freely on the inner surface of the proximal pipe section and without sliding of said rotatable means along said surface of the pipe section during simultaneous rotation of the pipe sections and axial movement of the boom means therewithin.

2. Apparatus as set forth in claim 1 wherein is provided a pair of said support means pivotally mounted on opposite sides of said boom means, aligned transversely of the latter and pivotal about intersecting axes in perpendicular relationship to the axes of said pipe sections, each of said support means carrying a corresponding, pipe section engaging rotatable means mounted for rotation on respective axes in perpendicular relationship to the axis of pivoting movement of a respective support means.

3. Apparatus as set forth in claim 2 wherein is provided third rotatable means adapted to engage the inner surface of a proximal pipe section, means mounting the third rotatable means on the end of the boom means proximal to said pair of support means and in disposition for free rotation on an axis perpendicular to the axes of said pipe sections, said means mounting the third rotatable means on the boom means including power structure under the control of said operator while in a prone position on said pallet means, for shifting the third rotatable means toward and away from the boom means along a path of travel of sufficient length to permit the third rotatable means to be moved into a first disposition engaging the inner surface of the proximal pipe section and with the rotatable means on said pair of support means out of engagement with said inner surface of the proximal pipe section, and into a second dispostion with said third rotatable means withdrawn from engagement with the surface of the proximal pipe section and the rotatable means on said pair of support means in supporting engagement with said proximal pipe sections.

4. Apparatus as set forth in claim 2 wherein each of said support means and the rotatable means thereon comprises a caster having a caster frame pivotally mounted on said boom means and rotatably carrying a caster wheel disposed to engage the inner surface of a proximal pipe section, the extended axes of pivoting of said caster frames trailing the axes of rotation of respective caster wheels, in the direction of rotation of said sections.

5. Apparatus as set forth in claim 1 wherein said driven sprocket is positioned above said idler sprockets and said intermediate portion of the chain means extends forwardly into engagement with a bottom portion of the rearmost idler sprocket, thence upwardly into engagement with a front portion of said rearmost idler sprocket, thence forwardly into engagement with a top portion of said driven sprocket, then downwardly into engagement with a front portion of said driven sprocket, next into engagement with a rear portion of the forwardmost idler sprocket, and thence forwardly into engagement with a bottom portion of said forwardmost idler sprocket and therebeyond.

References Cited in the file of this patent

UNITED STATES PATENTS

| | | |
|---|---|---|
| 1,679,499 | Rupley | Aug. 7, 1928 |
| 1,972,029 | Norquist | Aug. 28, 1934 |
| 2,034,451 | Tripp | Mar. 17, 1936 |
| 2,043,556 | Protin | June 9, 1936 |
| 2,260,260 | Mikesh | Oct. 21, 1941 |
| 2,655,585 | Brown | Oct. 13, 1953 |
| 2,749,421 | Mikulak et al. | June 5, 1956 |

FOREIGN PATENTS

| | | |
|---|---|---|
| 893,484 | Germany | Oct. 15, 1953 |